R. MANCHA AND J. TEIPEL.
STORAGE BATTERY LOCOMOTIVE.
APPLICATION FILED AUG. 31, 1918.
1,306,671.
Patented June 10, 1919.
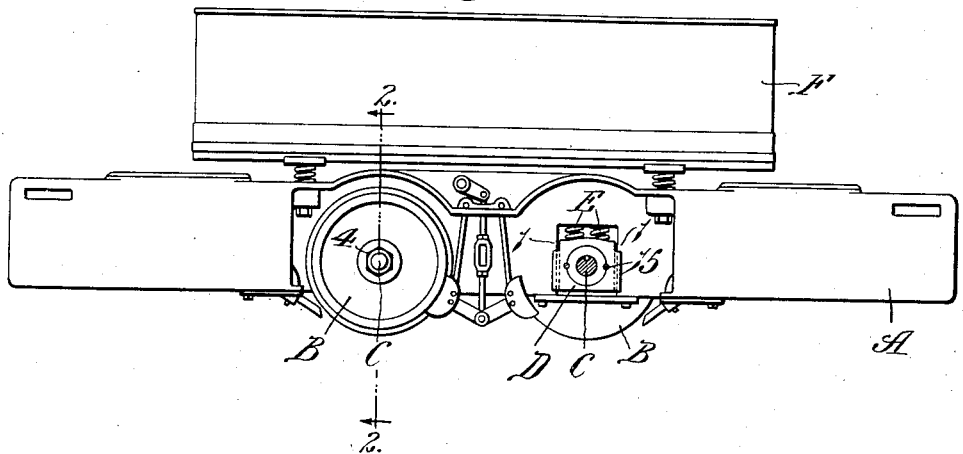
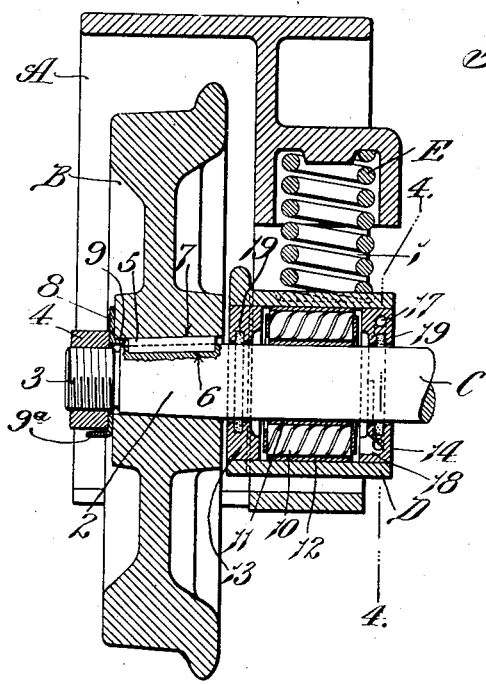
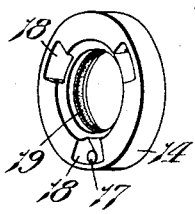
INVENTORS
RAYMOND MANCHA AND
JOSEPH TEIPEL,
By Bakewell Church Attys

UNITED STATES PATENT OFFICE.

RAYMOND MANCHA AND JOSEPH TEIPEL, OF ST. LOUIS, MISSOURI, ASSIGNORS TO MANCHA STORAGE BATTERY LOCOMOTIVE COMPANY, OF ST. LOUIS, MISSOURI, A CORPORATION OF DELAWARE.

STORAGE-BATTERY LOCOMOTIVE.

1,306,671. Specification of Letters Patent. Patented June 10, 1919.

Application filed August 31, 1918. Serial No. 252,217.

*To all whom it may concern:*

Be it known that we, RAYMOND MANCHA and JOSEPH TEIPEL, citizens of the United States, residing in the city of St. Louis, State of Missouri, have invented a certain new and useful Improvement in Storage-Battery Locomotives, of which the following is a full, clear, and exact description, such as will enable others skilled in the art to which it appertains to make and use the same.

This invention relates to storage battery locomotives.

The main object of our invention is to provide a storage battery locomotive that is an improvement on the locomotive described in United States Patent No. 1,224,122, dated April 24, 1917, in the following respects:

(1) A broken or worn wheel can be replaced by a perfect wheel without removing the wheel axle on which the broken or worn wheel is mounted or the journal boxes that support said axle; and (2) The journal boxes are equipped with roller bearings and are so constructed that said bearings can be kept thoroughly lubricated.

Figure 1 of the drawings is a side elevational view of a storage battery locomotive constructed in accordance with our invention.

Fig. 2 is a vertical sectional view, taken on the line 2—2 of Fig. 1.

Fig. 3 is a perspective view of the oiling device with which each of the journal boxes is equipped.

Fig. 4 is a vertical transverse sectional view of one of the journal boxes; and

Fig. 5 is a perspective view of one of the locking devices that is used for retaining the wheel nuts on the axles.

Referring to the drawings which illustrate the preferred form of our invention, A designates one of the side members of the frame of the locomotive, B designates the wheels, C the wheel axles, D the journal boxes which are slidingly mounted in journal box guides 1 on the side members A, E springs that are arranged above the journal boxes, as shown in Figs. 1 and 2 and F the box or housing in which the storage batteries of the locomotive are arranged.

Instead of permanently connecting the wheels to the wheel axles, as has heretofore been the usual practice in storage battery locomotives, the wheels of our improved locomotive are connected to the wheel axles in such a manner that they can be easily removed from the wheel axles while the wheel axles and journal boxes are in operative position in the frame of the locomotive. In the form of our invention herein illustrated each of the wheel axles C is provided at its outer end with a tapered wheel-receiving portion 2 on which a wheel is mounted and an externally screw-threaded spindle 3 that receives a nut 4 which holds the wheel in operative position on the tapered portion 2 of the axle, the hub of the wheel being provided with a tapered bore that snugly embraces the tapered portion 2 on the axle. The wheel is prevented from turning relatively to the axle by means of a key 5 that is arranged partly in a longitudinally-disposed pocket 6 in the axle and partly in a groove 7 formed in the tapered bore in the hub of the wheel. The groove 7 in the hub of the wheel extends clear through the hub from the outer to the inner face of the hub, but the pocket 6 in the tapered portion of the axle is closed at both ends, as shown in Fig. 2, so as to prevent the key 5 from shifting longitudinally of the axle. The wheel retaining nut 4 is securely locked on the spindle 3 by means of a locking washer 8 arranged between the nut and the front side of the hub of the wheel and provided with a laterally-projecting lip 9 that extends into the groove 7 in the hub of the wheel and a plurality of wings 9ª, one of which is adapted to be bent laterally into engagement with the nut 4 after said nut has been tightened. By constructing the locomotive in the manner above described we materially reduce the time and labor required to replace a broken or worn wheel with a perfect wheel, owing to the fact that it is not necessary to jack up the frame of the locomotive and remove the wheel axle and the journal boxes, as is necessary with the storage battery locomotives heretofore in general use.

The journal boxes D are equipped with roller bearings, and moreover, are so constructed that a lubricating medium can be easily supplied to the bearings, thus enabling the bearings for the wheel axles to be kept thoroughly lubricated. As shown in Figs. 2, 3 and 4, each of the journal boxes D consists of a body portion of rectangular shape in outline and provided with a horizontally-disposed bore of sufficient diameter to receive the wheel axle with which said journal box coöperates and a roller bearing that surrounds said axle, each of the roller bearings consisting of a plurality of rollers 10 arranged longitudinally of the axle with which they coöperate and positioned between a sleeve 11 that surrounds the axle and a sleeve 12 that is arranged in snug engagement with the cylindrical wall of the center bore in the body portion of the box. The front end of the center bore in the body portion of the box is closed by an annular plug 13 and the rear end of said bore is closed by an oiling device 14 of substantially annular form that constitute the end walls of the chamber in which the roller bearing is arranged, said plug and oiling device being connected to the body portion of the box in any suitable manner, preferably, however, by means of screws 15 that are arranged in alined notches formed in the body portion of the box and in the periphery of the plug 13 and the oiling device 14. Means is provided for supplying a lubricating medium to the chamber in the journal box in which the axle bearing is arranged, and while various means may be used for this purpose, we prefer to provide each journal box with a lubricant holder 16 that communicates with a duct $d$ in the body portion of the box whose inner end communicates with a duct 17 formed in the oiling device 14. The duct 17 extends circumferentially around the oiling device 14 at a point between the inner and outer edges of said device, and a plurality of oil pockets 18 are formed in the inner face of the oiling device 14, as shown in Fig. 3, said oil pockets communicating with the oil duct 17. At frequent intervals the lubricant holder 16 is filled with oil or some other suitable lubricating medium, which lubricating medium flows through the ducts $d$ and 17 and the oil pockets 18 into the chamber in the box in which the roller bearing is arranged, thereby enabling the bearings in which the axles turn to be kept thoroughly lubricated. The lubricant that is supplied to the bearings is prevented from escaping from the journal boxes by means of washers 19 of felt or some other suitable material that are mounted in the plugs 13 and in the oiling devices 14 in such a manner that they surround the axles C.

Having thus described our invention, what we claim, and desire to secure by Letters Patent, is:

1. A storage battery locomotive, comprising a frame, wheel axles on said frame, each of which is provided at its end with a tapered portion and an externally threaded spindle, a wheel mounted on the tapered portion of the axle and having an open-ended groove formed in the hub of same, a pocket in the tapered portion of the axle, a key in said pocket that enters the groove in the hub of the wheel, a nut mounted on the spindle of the axle for retaining the wheel in operative position, and a lock washer arranged between said nut and the hub of the wheel and provided with a laterally-projecting portion that enters the groove in the hub of the wheel.

2. In a storage battery locomotive, a journal box provided with a cylindrical bore of uniform diameter throughout its entire length through which a wheel axle extends, annular devices arranged inside of said bore at the opposite ends of same and detachably connected to the journal box so as to form the end walls of same, and a roller bearing in said bore surrounding the wheel axle and comprising a sleeve that bears snugly against the side wall of said bore.

3. In a locomotive, a journal box provided with a cylindrical bore of uniform diameter throughout its entire length through which a wheel axle extends, annular devices arranged inside of said bore at the opposite ends of same and detachably connected to the journal box to form the end walls of same, a roller bearing in said bore surrounding said wheel axle and comprising a sleeve that bears snugly against the side wall of said bore, a lubricant holder arranged on the outside of said journal box, and passageways in one of said annular devices through which the lubricating medium is supplied from said holder to the roller bearing in the journal box.

4. In a locomotive, a journal box provided with a cylindrical bore of uniform diameter throughout its entire length through which a wheel axle extends, annular devices arranged in said bore at the opposite ends of same to form the end walls of the box, a roller bearing surrounding the wheel axle and arranged in said bore between said annular devices, felt washers in the inner edges of said annular devices adapted to bear upon said axle, oil pockets formed in the inner side face of one of said annular devices, and means for supplying a lubricating medium to said pockets.

RAYMOND MANCHA.
JOSEPH TEIPEL.